Nov. 17, 1959     PER BÖRJE FONDÉN ET AL     2,913,197
ARRESTING NET FOR AIRPLANES
Filed Sept. 25, 1956                          2 Sheets-Sheet 2
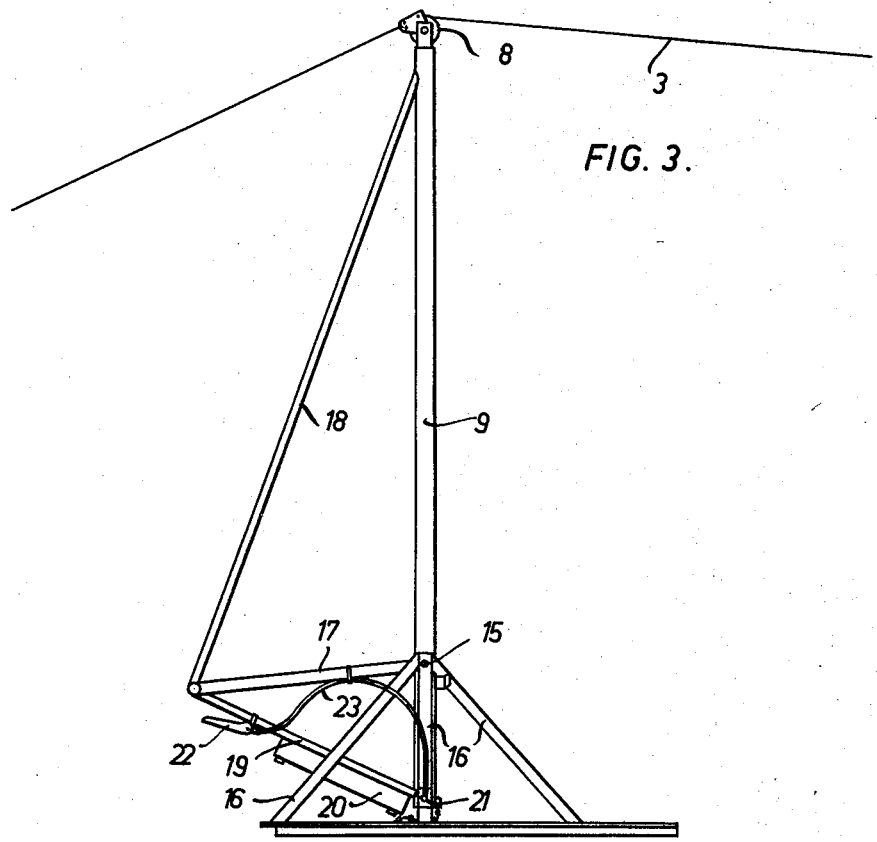
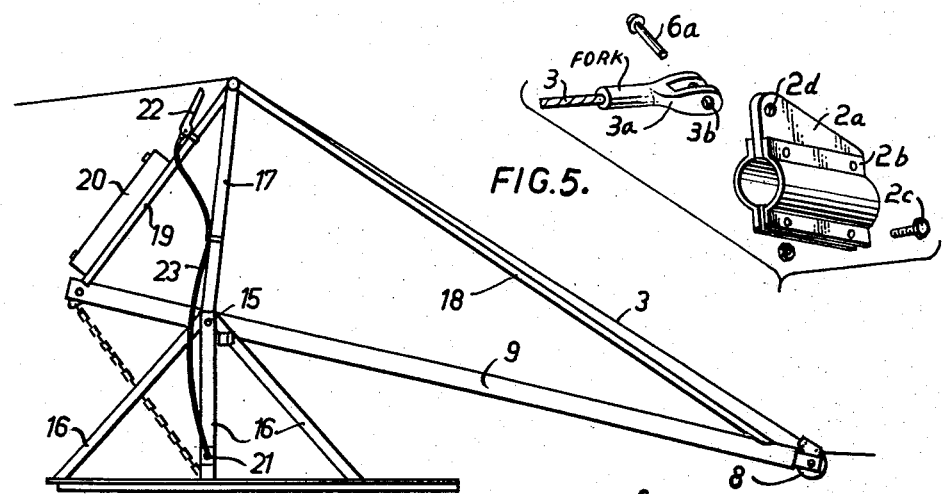
Inventors
Per Börje Fondén
Karl Ove Torgny Walander
by Sommers & Young
Attorneys

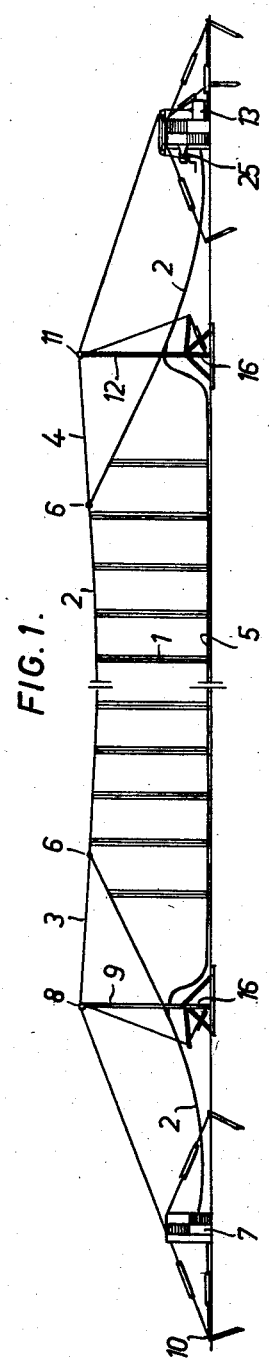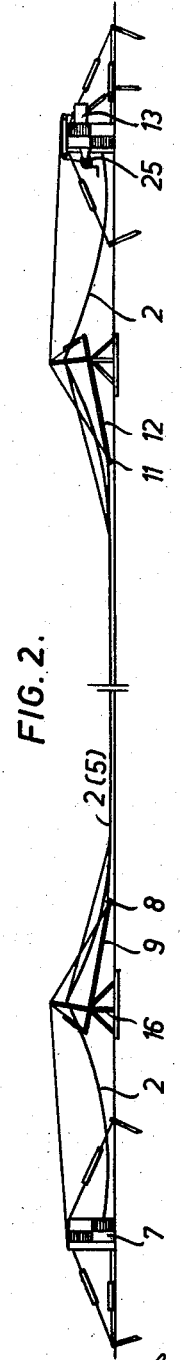

United States Patent Office 2,913,197
Patented Nov. 17, 1959

2,913,197

ARRESTING NET FOR AIRPLANES

Per Börje Fondén and Karl Ove Torgny Wålander, Linköping, Sweden

Application September 25, 1956, Serial No. 611,831

4 Claims. (Cl. 244—110)

The present invention relates to arresting nets for airplanes.

It is already known at starting and landing fields for airplanes to provide nets by means of which an airplane which cannot lift at starting or stop at landing on the available length of path may be caught and arrested.

It is an object of the invention to provide a net for such purpose which may be readily raised to operative position ready for catching and arresting an airplane or lowered to permit an airplane to pass thereover freely.

Since such arresting nets, especially those for use on large landing fields, as a rule, are very large, the hitherto practised method of placing the nets on the ground by merely tilting them forwardly or rearwardly with relation to the direction of flight, while they are still in their unfolded state, means a severe drawback. This is because of the fact that by such a lowering operation great mass powers will appear at the raising operation so that the safety clutches as used for releasing the net from the suspending device, had to be dimensioned to withstand a, from other points of view, inappropriately high power. A further drawback arises from the net freezing fast to the ground during cold weather.

A special object of the invention is to provide an arresting net of such a design as to avoid the aforesaid drawbacks.

A further object is to provide simple means for allowing an automatic adjustment of the stress on the net as well as for limiting the variations of the length of the net caused by the raising and lowering operations to the smallest degree possible in order to avoid too sudden pulls on the net when catching an airplane.

More particularly, the invention has reference to such airpulane arresting nets which are supported by masts at both ends.

A characteristic feature of the invention involves mounting said masts so that they may be raised and lowered in a plane substantially parallel with the plane of the raised net.

This and other features of the invention will more clearly appear from the following description, reference being had to the accompanying drawings.

In the drawings, Fig. 1 is a side elevation of the net in raised position, and Fig. 2 is a side elevation thereof in lowered position. Figs. 3 and 4 are side elevations of a mast in raised and lowered positions, respectively. Fig. 5 is an exploded view of the releasable coupling mechanism.

The net shown comprises a plurality of groups of vertical ropes 1 supported by a top main wire 2 in its turn supported by wires 3 and 4. At their lower ends the vertical ropes 1 are connected to a lower main wire 5 which is connected at its ends to the upper main wire 2.

The supporting wires 3 and 4 are connected to inner points of the upper main wire 2 by means of couplings 6 of such a structure as to release the net from the supporting wires 3 and 4 by the net catching an airplane, thereby allowing the net to be subjected to a soft braking action exerted by a braking mechanism 7, from which the wire 2 may unwind itself during the arresting period against the action of said braking mechanism.

A known braking mechanism suitable for this purpose is disclosed in U.S. Patent No. 2,483,655 to A. B. Schultz, dated October 4, 1949.

A suitable releasable coupling mechanism is shown in Fig. 5 in which a breakable pin 6a serves for connecting coupling plate 2a with coupling for 3a attached to wire 3. Plate 2a is connected to wire 2 by clamp 2b having suitable clamping bolts 2c. Plate 2a and fork 3a are provided with transverse openings 2d and 3b, respectively, through which breakable pin 6a extends.

The supporting wire 3 is led over a guide pulley 8 at the top of a mast 9 and has its end anchored to the ground at 10. The other supporting wire 4 is led over a guide pulley 11 at the top of another mast 12 and loaded at its free end by a counter-weight 13 of such a value as to keep the net under the appropriate tension.

The masts 9 and 12 are both of the same structure so that only one of them, viz. that numbered 9, will be hereinafter described in detail with reference to Figs. 3 and 4.

Both masts are mounted so as to be capable of being raised and lowered in a plane parallel with the plane of the raised net. Thus, the masts may be arranged for turning in said plane towards each other, or away from each other, or parallel to each other in the one direction or the other. In the drawings, the masts are mounted for turning towards each other.

The mast 9 shown in Figs. 3 and 4 is mounted to turn on a pivot 15 in a frame 16. For stiffening purposes an auxiliary mast 17 is provided rigidly secured to the mast 9 which projects substantially at right angles thereto from a point thereof right opposite the pivot 15. Extending from the free end of the auxiliary mast 17 to the top end of the main mast 9 is a stay 18 and extending from the free end of the auxiliary mast to the bottom end of mast 9 is a stay 19. The last-mentioned stay carries a counter-weight 20 situated so as to substantially balance the entire mast structure. The mast 9 is maintained in upright position by means of automatic locking means at 21 which may be released by means of a handle 22 connected to the locking means by a spring 23.

The raising of the net may be effected either by power controlled means, not shown, or by hand operated means, as indicated at 25 in Figs. 1 and 2.

We claim:

1. An arresting device for airplanes comprising in combination, a net, a pair of masts positioned on the ground at a distance from each other for supporting said net in a vertical plane, said masts being tiltable in a vertical plane substantially at right angles to the intended direction of flight of an airplane to be arrested that is to say, parallel with that of the net when in its raised position for allowing the net to be lowered to ground, means for holding the raised net under tension, and means for exerting a braking action on the net when engaged by an airplane to be arrested.

2. An arresting device for airplanes comprising in combination, a pair of masts positioned on the ground at a distance from each other, said masts being tiltable in a common vertical plane, a net consisting of a pair of longitudinal wires and groups of transverse ropes provided between said wires, wires led over the tops of said masts for supporting the net in a vertical plane substantially parallel with the common tilting plane of the masts, means to hold the said supporting wires stretched, and a braking mechanism connected to the longitudinal wires of the net independently of said supporting wires.

3. An arresting device for airplanes comprising in combination, a pair of masts positioned on the ground at a distance from each other, said masts being tiltable in a common vertical plane, guide pulleys at the tops of said masts, a net consisting of longitudinal wires and transverse groups of ropes therebetween, supporting wires connected to one of said longitudinal wires of the net by means of disengaging couplings, adapted to release automatically under the action of the stress as exerted on the net by an airplane caught thereby, said supporting wires being led over the said guide pulleys at the tops of the masts, one of said supporting wires being anchored to the ground at its end remote from the net, and the other supporting wire being loaded by a counterweight for subjecting the net to a suitable tension, and a braking device connected to one end of the net independently of the supporting wires for exerting a braking action on the net when engaged by an airplane to be arrested.

4. An arresting device for airplanes comprising in combination, a pair of masts positioned on the ground at a distance from each other, frames for hingedly supporting said masts so as to allow them to be tilted in a common vertical plane at right angles to the intended direction of flight of an airplane to be arrested, means on said frames for locking the masts in raised state, hand controlled means for releasing said locking means, means for balancing the masts during their tilting movement, guide pulleys on the tops of the masts, a net including a set of longitudinal wires and groups of transverse ropes therebetween, wires for supporting said net between the masts in a plane substantially parallel to the tilting plane of the masts, disengaging couplings for connecting said supporting wires to the net, said couplings being adapted to be automatically disengaged under the action of the stress exerted on the net by an airplane caught thereby, one of the supporting wires being led over the guide pulley at the top of one mast and anchored to the ground at its end remote from the net, and the other supporting wire being led over the guide pulley at the top of the other mast and loaded by a counterweight at its end remote from the net, a braking device connected to the longitudinal wires of the net at one end thereof for exerting a soft braking action on the net when engaged by an airplane to be arrested, and means for raising the net from its lowered state.

References Cited in the file of this patent

UNITED STATES PATENTS

| 1,428,163 | Harriss | Sept. 5, 1922 |
| 2,450,328 | Cotton | Sept. 28, 1948 |

FOREIGN PATENTS

| 578,440 | Great Britain | June 28, 1946 |